(12) United States Patent
Bornhorst

(10) Patent No.: US 8,630,049 B2
(45) Date of Patent: Jan. 14, 2014

(54) ADJUSTABLE COLOR CORRECTION AUTOMATED HIGH INTENSITY STAGE LIGHTS

(75) Inventor: James Bornhorst, Point Venture, TX (US)

(73) Assignee: Production Resource Group, LLC, New Windsor, NY (US)

( * ) Notice: Subject to any disclaimer, the term of this patent is extended or adjusted under 35 U.S.C. 154(b) by 187 days.

(21) Appl. No.: 13/151,124

(22) Filed: Jun. 1, 2011

(65) Prior Publication Data

US 2012/0307388 A1     Dec. 6, 2012

(51) Int. Cl.
*G02B 5/22*     (2006.01)
(52) U.S. Cl.
USPC ........................................ 359/888; 359/885

(58) Field of Classification Search
USPC .................... 359/888, 891, 892, 885; 353/84; 362/583, 18; 348/342
See application file for complete search history.

(56) References Cited

U.S. PATENT DOCUMENTS

| | | | | |
|---|---|---|---|---|
| 5,371,655 | A * | 12/1994 | Murdock et al. | 362/18 |
| 6,494,606 | B1 * | 12/2002 | Ferrante | 362/583 |
| 8,040,425 | B2 * | 10/2011 | Shibuya et al. | 348/342 |

\* cited by examiner

*Primary Examiner* — Audrey Y Chang
(74) *Attorney, Agent, or Firm* — Law Office of Scott C. Harris, Inc.

(57) ABSTRACT

Color correction system for an automated stage light that allows the color temperature of the light beam to be continuously adjustable to both a higher and lower Kelvin value than the natural temperature of the open beam, by filtering using a dual peak filter and also color correcting the beam.

39 Claims, 9 Drawing Sheets

ADJUSTABLE COLOR CORRECTION AUTOMATED HIGH INTENSITY STAGE LIGHTS

BACKGROUND

Many automated stage light fixtures are fitted with an arc lamp which is the source of light for the fixture. These lamps, commonly called High Intensity Discharge (HID) sources, produce light by continuously discharging a plasma arc through a high pressure mixture of mercury vapor, noble gases and the evaporated salts of rare earth elements. When excited by the plasma arc, this mixture creates a small-volume light emitter with high luminous efficiency. The color and quality of the light emitted is primarily determined by the mixture of these elements and is typically similar to daylight with a Correlated Color Temperature (CCT) of about 6000 Kelvins.

Often these automated luminaires are used in conjunction with other lighting instruments in a television studio or on a film set. It then becomes desirable to adjust the color temperature of the HID source to match that of the other lighting instruments so that the different light sources will be rendered to look the same by the film or television camera. Typically the conventional lights have a tungsten filament source which produces light with a CCT of 3200 Kelvins. Often spotlights and other sources are used that have other, and sometimes higher color temperature beams. Therefore, the desired color temperature of the automated luminaire is dependent on the particular shot the camera is taking and on the other lighting instruments used in that particular shot.

In addition to color temperature, a second and equally important quality of the light emanating from the instrument is its Color Rendering Index (CRI). The illuminating beam's CRI is a measure of how well balanced its spectrum is compared to that of natural daylight or more specifically, compared to a black body radiator at a similar color temperature. Light with a high CRI renders all colors faithfully while that with a low CRI, like poor quality fluorescent illumination, can give false impressions of colors. Therefore having a luminaire with adjustable CCT while maintaining a high CRI is very beneficial as the cameras will render their subjects' color faithfully. This is especially important when the subject is human skin since we are all extremely sensitive to the appearance of skin tones. Light with a low CRI illuminating an individual can make them look ill.

Existing adjustable color temperature correcting systems for automated luminaires are capable of only lowering the color temperature of the light. Furthermore, the CRI of the adjusted light usually deteriorates as the color temperature is adjusted which is inherent in the design of the filtration system. The filtration is typically an optical thin film applied to a glass wheel where a portion of the wheel intersects the light source beam inside the luminaire.

The filter 100 is typically spatially patterned to produce a density gradient that runs circumferentially around the wheel as shown in FIG. 1A running from an open area at 110 to a low density area at 115, to higher density areas at 120. This allows the saturation of the filter coating to vary around the wheel. The rotational position of the wheel then controls the color temperature of the beam exiting the luminaire.

At the beginning of the gradient, the patterning completely removes all of the filter material so it has no effect on the natural color temperature of the beam. This is called the "open" position 110 of the filter wheel. At the end of the gradient or "full-in", position 130 most or all of the filter material is left on the wheel so that the color temperature of the filtered beam is the desired minimum CCT, usually around 3000 Kelvins. In between, over the area 120 the varying density filter gradient causes a changing ratio between filtered and unfiltered light passing through the wheel and therefore a change in CCT of the beam. The changing CCT of the light beam with wheel position is illustrated in the 1933 CIE chromaticity diagram of FIG. 1B as a series of points connected by the dotted line. The color temperature of several points along the line are noted beginning with the "open" temperature of the unfiltered beam of 5600K and ending with the "full-in" CCT of 2450K.

Note that the locus of filtered color correction points is straight between "open" 210 and "full-in" 220 indicating that a change in saturation has been caused by the filtration, the saturation of the color point being affected by the patterning density while the hue imparted by the filter material remains constant. Note also that the CRI of the light decreases as the locus of filtered light diverges away from the Planckian Locus or Black Body Curve; the Planckian Locus being the locus of white points all having a perfect Color Rendering Index of 100.

SUMMARY

Embodiments describe a color correction system for an automated stage light that allows the color temperature of the light beam to be continuously adjustable to both a higher and lower Kelvin value than the natural temperature of the open beam.

Another aspect improves the Color Rendering Index of the open beam at all color temperatures so that the light from the stage light renders all colors accurately.

DETAILED DESCRIPTION

Figure 1A:
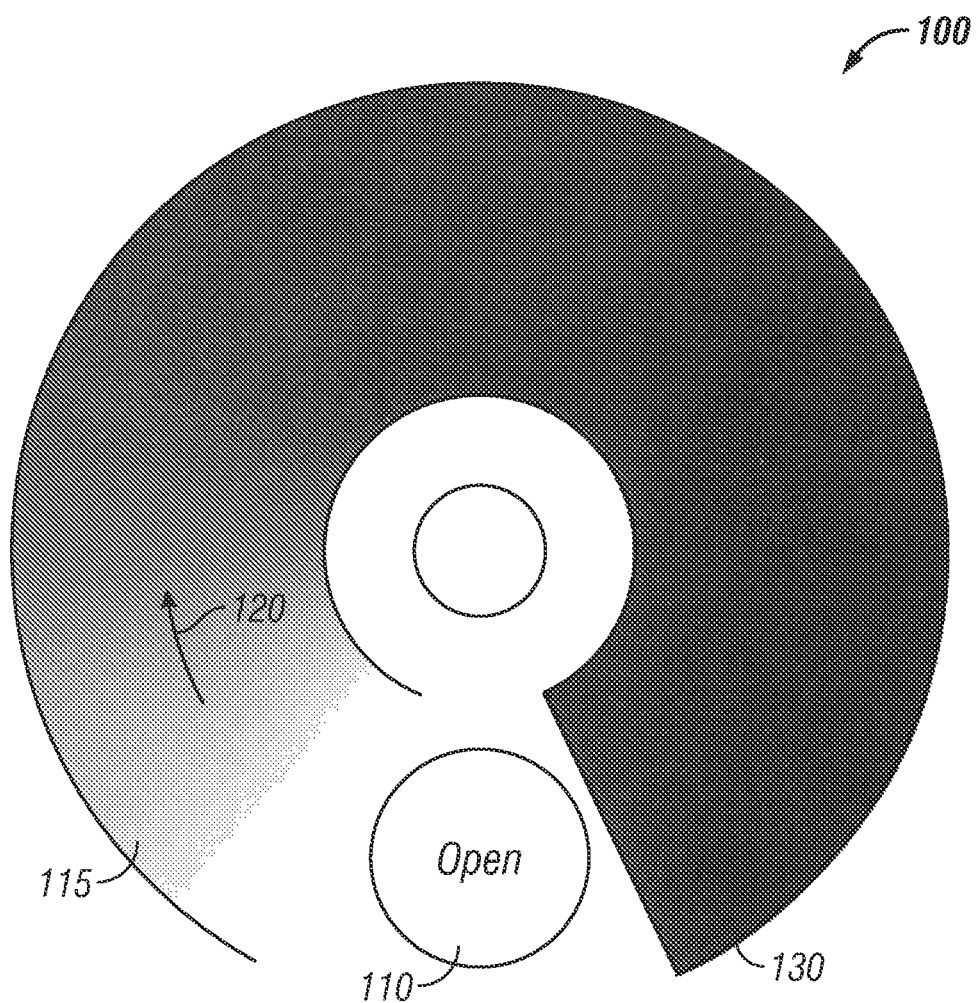
FIG. 1A shows a gradient color wheel.
Figure 1B:
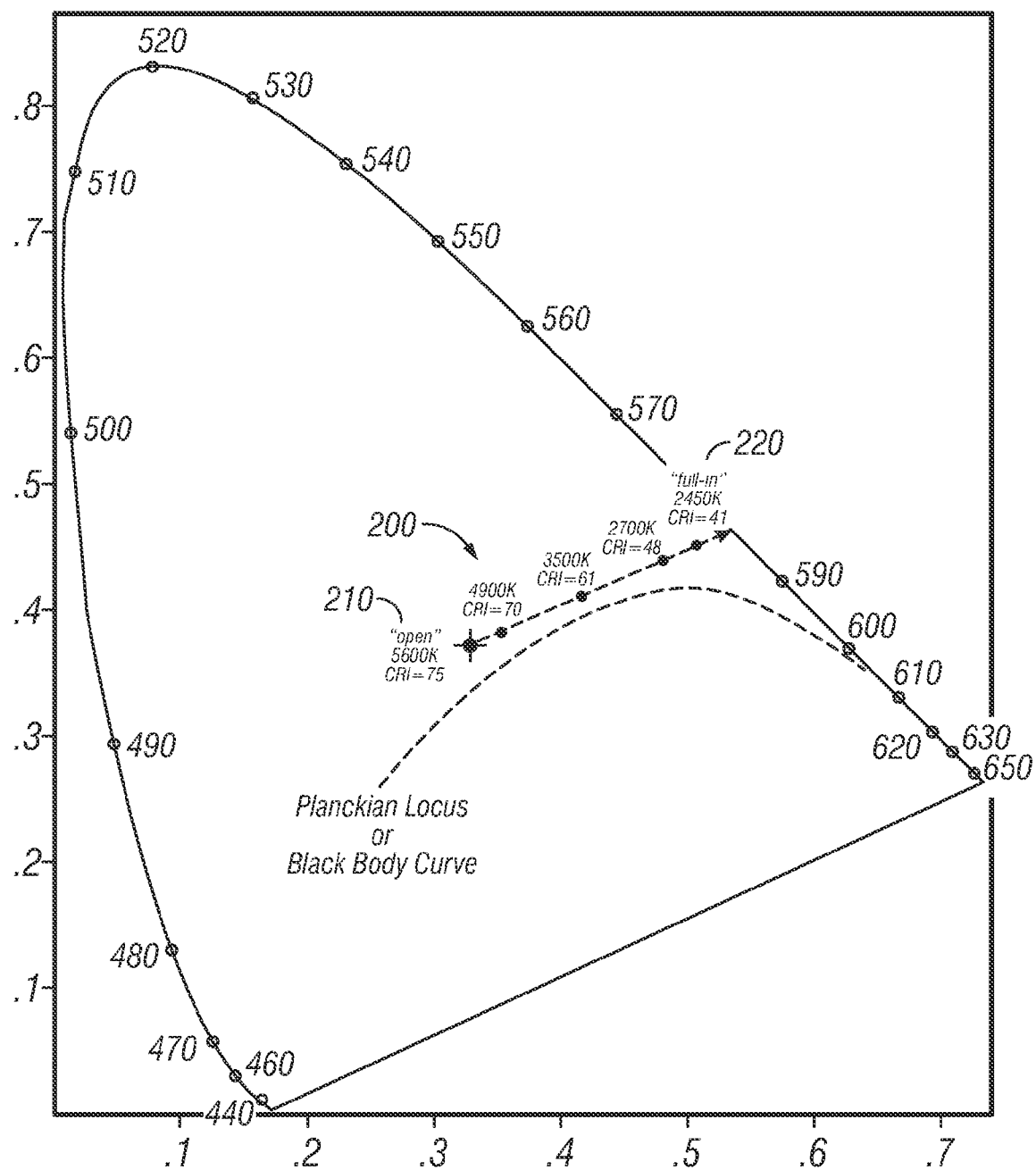
FIG. 1B shows a prior art chromaticity diagram.
Figure 2:
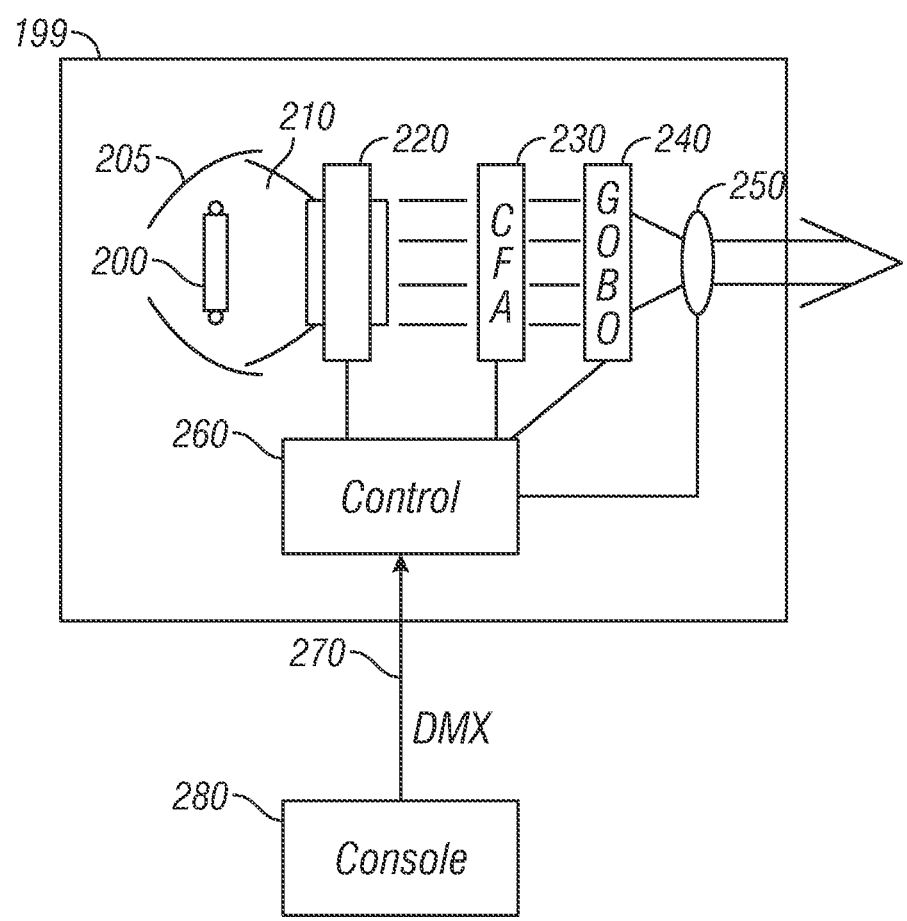
FIG. 2 shows a block diagram of a luminaire being controlled by a controlling console.

An embodiment is shown in FIG. 2. In this embodiment, a luminaire 199 is formed with a number of parts. The light from the luminaire is created by a High-energy discharge arc lamp 200 that produces high-energy light which is focused into a beam 210 via reflector 205.

Figure 3:
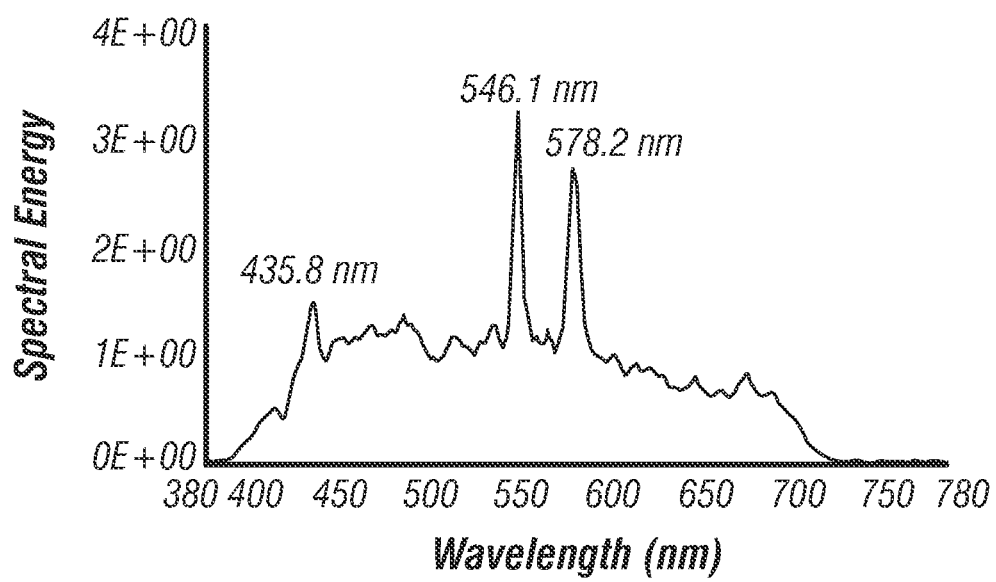
FIG. 3 shows the arc spectrum of an HID lamp.

FIG. 3 shows a typical emissions spectrum produced by such an HID arc lamp. Since the term HID encompasses an entire family of sources, it should be understood that the spectra of individual lamps within the family vary somewhat as each lamp is designed to produce a particular color temperature of light and to have other special characteristics, such as a compact arc length or an extended lifetime. The design for these performance characteristics affects the spectral energy distribution of the light produced by each lamp within the family. However all HID sources have a common signature; that of the prominent spectral peaks that result from the emissions from the excited mercury vapor in the plasma arc. Three spectral peaks stand out above the wide-band radiation from the other elements in the plasma: a deep blue color peak at 435.8 nm, a blue-green peak at 546.1 nm and a yellow-green peak at 578.2 nm, the latter two being the most dominating.

The smallest peak at 435.8 nm has little effect on CRI as the Test Color Samples (TCS) used to calculate the CRI value are not strongly influenced by this deep blue peak and the eye response at that wavelength is significantly diminished. The two dominant central spectral peaks are particularly problematic however, as they contain a significant amount of spectral energy, are centered in the middle of the photopic curve where the human eye is most sensitive and they are not of a particularly attractive color, especially when applied to human skin. Furthermore, television cameras and to some extent, digital or film cinema cameras, are excessively sensitive to the peak energies in these two bands. Generally, they tend to respond exceptionally to these peaks; rendering a scene with strong green and blue-green hues.

According to an embodiment, the inventor recognizes that these two central peaks created by the light source/lamp can be problematic for illumination, by creating colors which many may find objectionable.

FIG. 2 shows how the beam 210 is filtered through a color correction wheel 220 described herein. This color correction wheel may reduce these peaks by applying a very selective and efficient multi-layer dielectric interference filter according to embodiments, dielectric interference filter has different parts that are coated on different sides of the color correction wheel 220. FIG. 2 also shows how the filtered beam can also be passed through other optical components, including a color filter array 230, of gobo 240, and a zoom lens 250. All of these parts are controlled by the controller 260 which may be a computer that receives its commands via DMX 270 from a console 280. The controlling of the color correction wheel 220 may include rotating the color correction wheel to a specified location as described herein.

Figure 4:
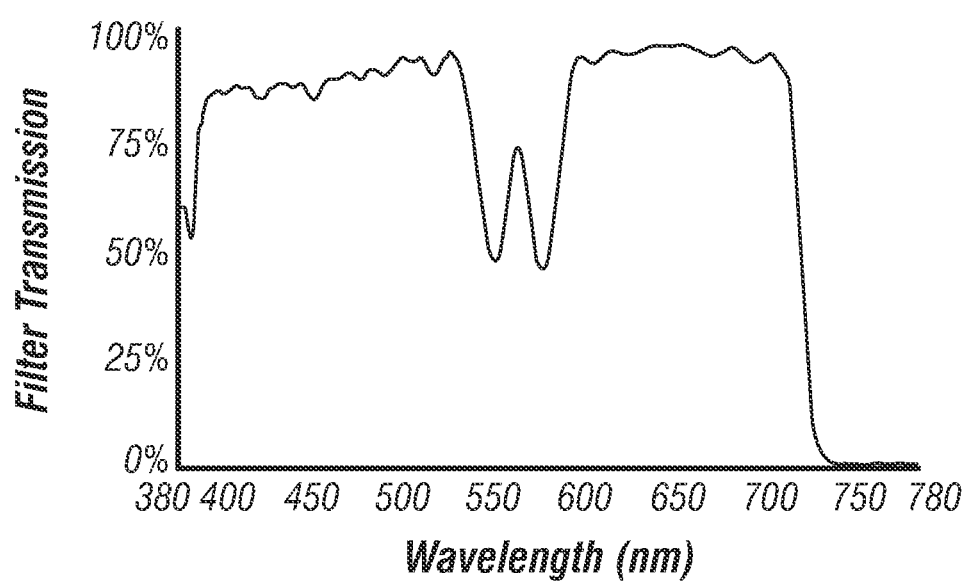
FIG. 4 shows the characteristics of the peak suppression filter used according to an embodiment.

FIG. 4 shows the transmission characteristics of such a practical, dual peak suppression filter. The filter has an optical substrate with a coating. The coating has values which are selected to reduce the intensity of the two mid-band mercury peaks without removing all of the energy in the area which would defeat the purpose of the filter by overcompensating, leaving holes in the spectrum and again, negatively affecting the CRI. The filter is also designed to pass those wavelengths outside the rejected bands with high efficiency so that the natural color temperature of the beam is minimally affected and the overall light intensity is not significantly reduced. As can be seen by the peak suppression filter of FIG. 4, the two peaks of 546.1 nm and 578.2 nm are attenuated by approximately 50%. The area substantially outside of these values, that is areas below approximately 520 nm, and areas above approximately 600 nm are minimally attenuated. For example, the attenuation in those areas may range between 15 and 20%, as compared with the 50% attenuation in the desired attenuation areas. More generally, however, the peaks can be at different specific values, and the coating on the optical substrate can be adjusted to remove these peaks. In other embodiments, the amount of removal can be by any amount less than 70 to 80%, but more preferably less than 55%.

Figure 5:
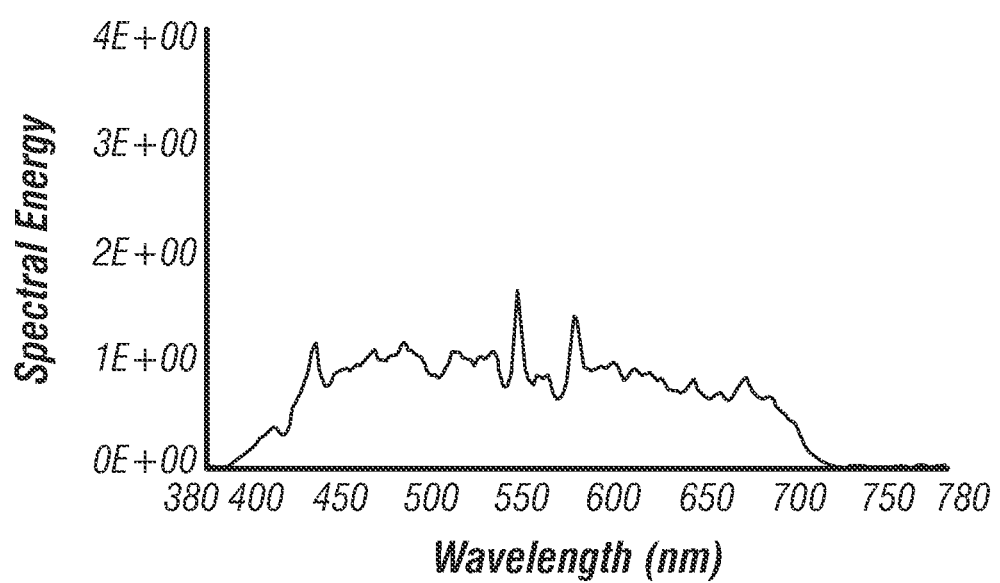
FIG. 5 shows the filtered HID arc spectrum.

FIG. 5 shows the effect of the filter on the arc lamp spectrum of FIG. 3. Note that the two peaks have been successfully suppressed and the CRI of the improved spectrum has risen from 75 to 93, a very acceptable level. The color temperature has changed slightly since some mercury peak energy has been attenuated but the change from 5600K to around 6200K is a minimal mired shift of −16 MK-1 and still well within what is considered the "daylight" range.

Figure 6A:
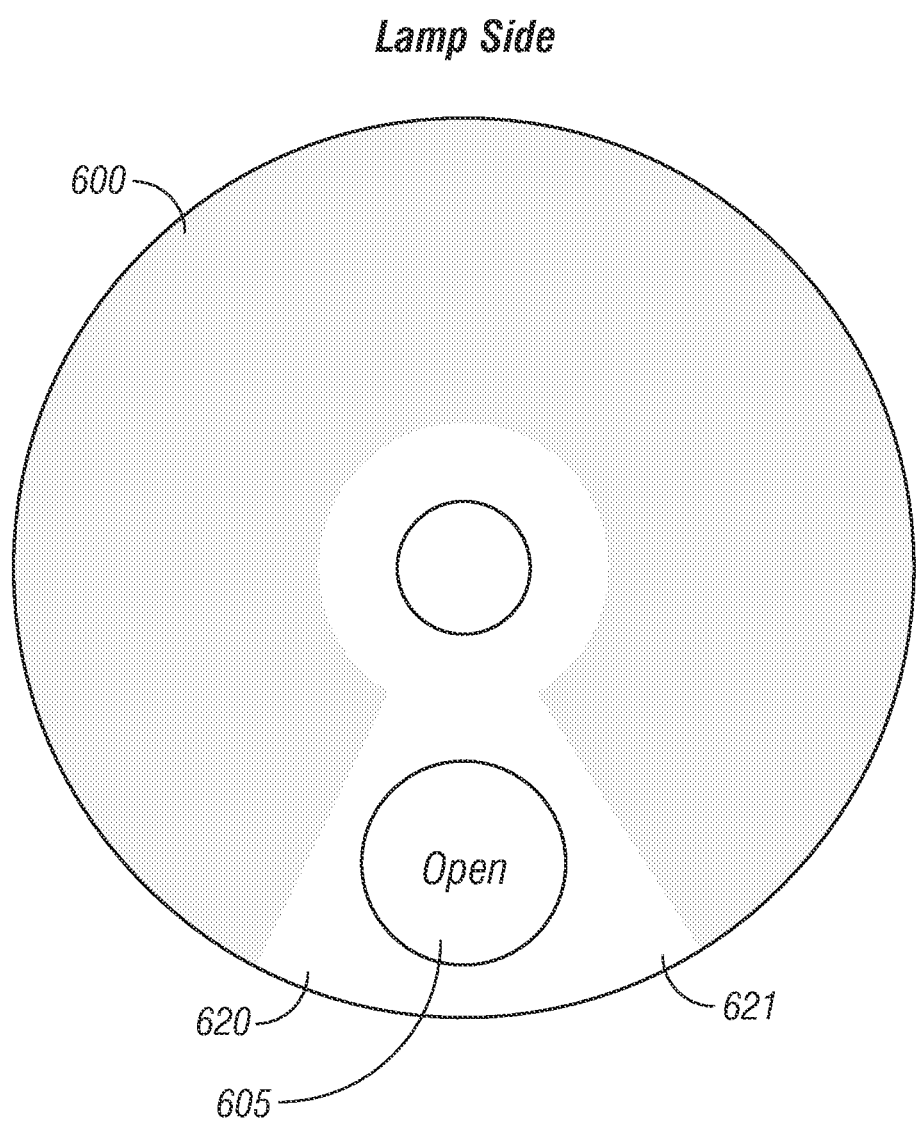
FIGS. 6A and 6B respectively show the lamp side and lens side coating according to the present application.
Figure 6B:
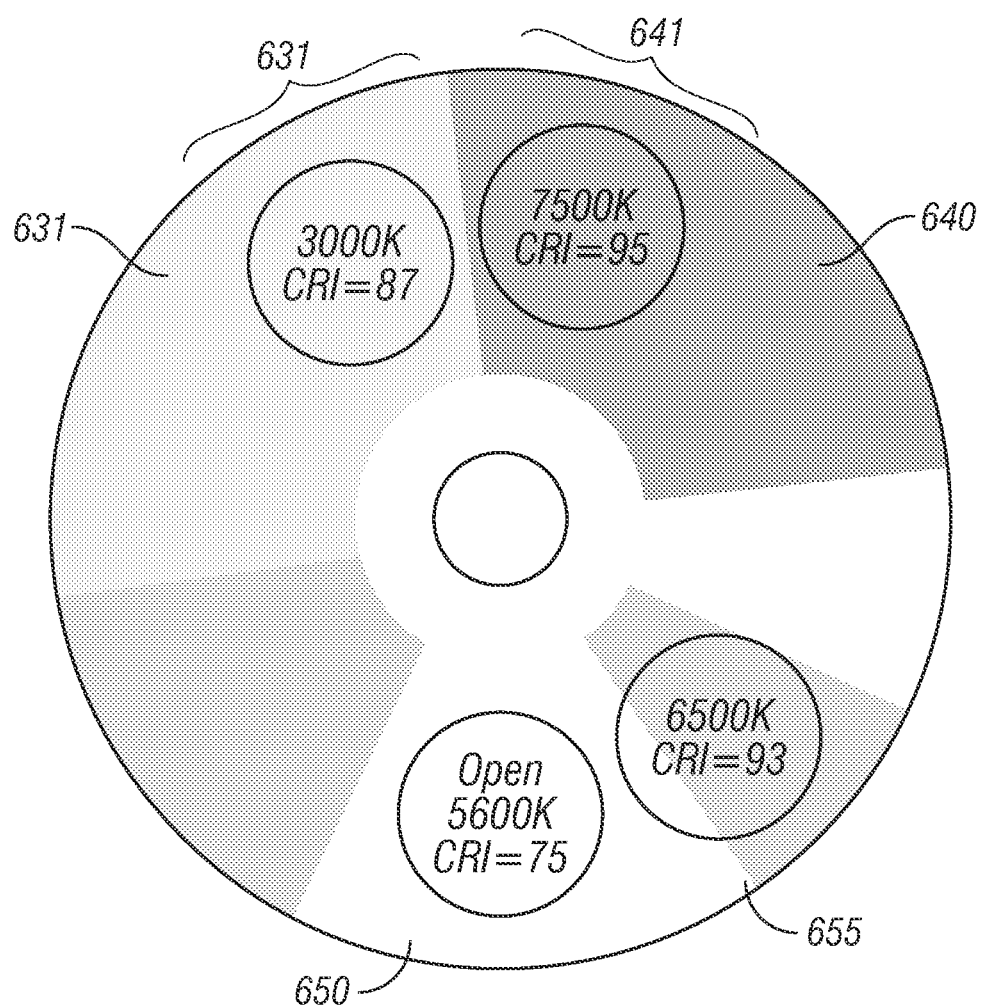

Discussion will now focus on the composite color correction wheel according to an embodiment. FIGS. 6A and 6B respectively show the lamp side (light incident side) and lens side (light exiting side) of a color correction wheel that is intended for correcting the specific high intensity discharge light. However the order of the films does not affect the overall filtration and final beam color.

Typically, automated luminaires employ circular filter components to control the color and intensity of the projected beam because rotational motion is relatively easy to implement and the circular filters take up the least amount of space. This embodiment is shown as However in some lighting applications, rectangular filter is shown as 220 in FIG. 2. Elements are put into practice and positioned with linear motion actuators controlled by the controller 260 based on local or remote commands. While the embodiment of FIG. 6A/6B shows a color wheel, the techniques described herein can be used with any other shape of filter element. That said, the discussion will focus on the circular color wheel embodiment.

On the lamp side shown in FIG. 6A, almost the whole surface over the area 600 is coated with the dual peak suppression filter. There is a sector 605 at the bottom of the wheel that is uncoated and meant to pass the unfiltered light beam. The area 605 where the circular beam passes is labeled "Open". The edges 620, 621 of the suppression filter on either side of the open position may be patterned with a density gradient so that the filter edge is not visible in the projected beam when the wheel rotates and imparts filtration. If the edge of the filter is hard it could otherwise produce an obtrusive wipe as it moves across the beam.

The lens side of the wheel shown in FIG. 6B is coated with two different color correction filters 630, 640, each residing in two distinct sectors of the wheel. Coincident with the lamp side, a third sector 650 of the wheel's lens side is left uncoated to pass the "Open" beam. This uncoated portion extends in the area 655 beyond the open sector to reveal the underlying peak suppression filter so that it may act alone on the passing beam.

One of the color correction filters is designed to raise the color temperature of the beam to a specific value, say 7500 Kelvins shown in the area 640. The other color correction filter in the area 630 is designed to lower the CCT of the beam. The films specifically compensate the beam color when they are used in conjunction with the peak suppression film 600 since the two films lie on top of the peak suppressor 600 shown on the lamp side of FIG. 6A.

Both color correction films 630, 640 are patterned with a density gradient so that the saturation of the films varies circumferentially from nothing (zero) to a level producing the desired final CCT.

Figure 7:
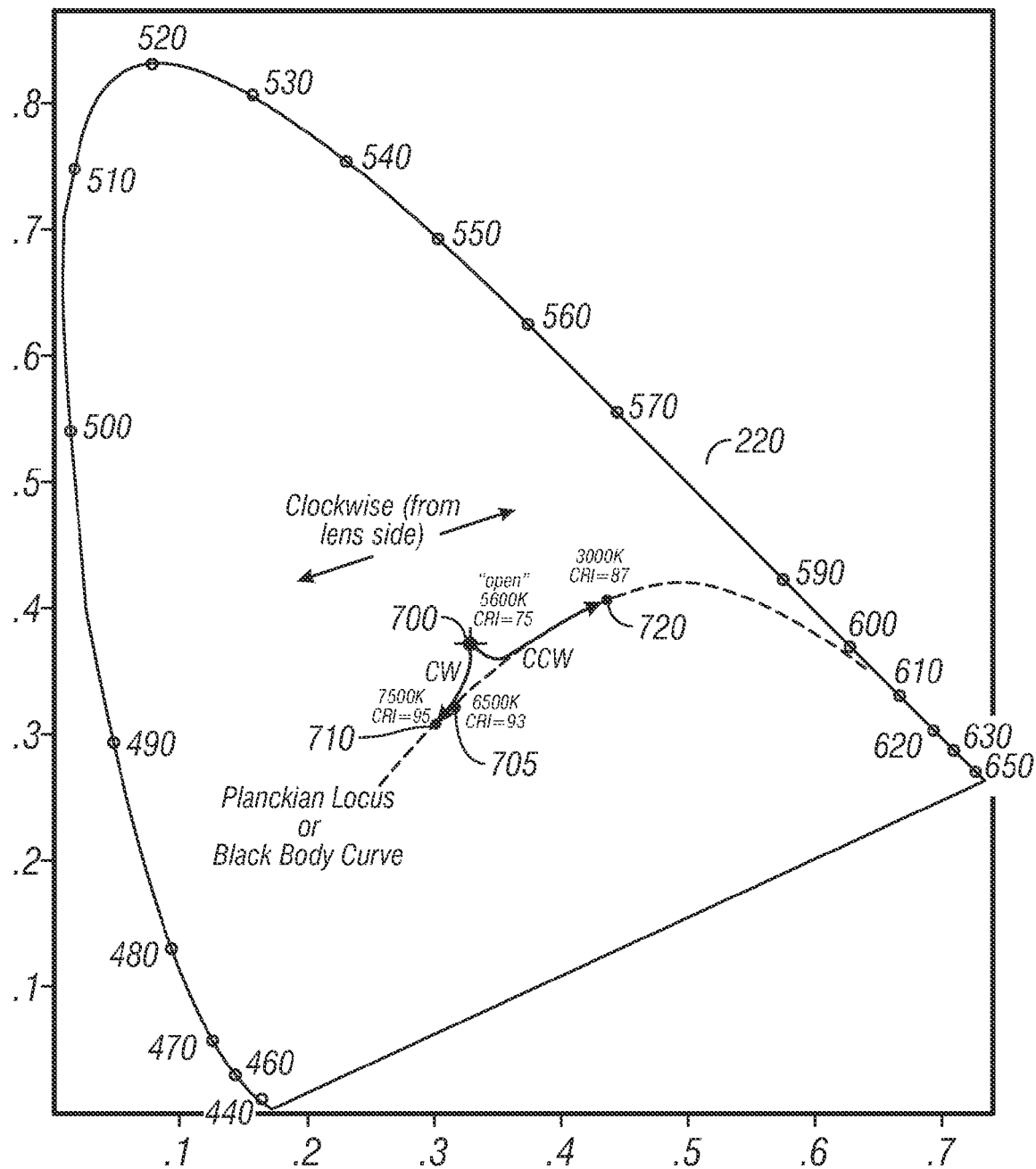
FIG. 7 shows the chromaticity diagram of a composite color correction wheel.

FIG. 7 shows a portion of a CIE Chromaticity Diagram showing the loci of the beam color at different wheel rotation locations. Rotating the composite wheel produces the following effect(s) on the output beam of the automated luminaire. In the open position the arc lamp beam passes through area 605 and 650. The light is unfiltered and, for a typical compact HID arc, has a CCT of 5600K with a CRI of only 75 shown in the chromaticity diagram as 0.700. Rotating the wheel in a clockwise direction (when viewed from the lens side) to the portion with only the peak suppression filter 655 moves on the chromaticity diagram to raise the CCT 6500K and the CRI rises to 93, shown as 0.705 in FIG. 7. The rise in CCT and CRI is attributed solely to the suppression of the two mercury peaks.

Thus, the patterning the films creates a saturation gradient that causes the loci of color correction points caused by the films gradient to lie in a straight line. The wheel may be constructed with multiple color correcting filter segments that track the black body curve in a piece-wise manner.

Rotation further in the clockwise direction begins to bring into play the blue film gradient 640 on the lens side of the wheel which raises the color temperature further while preserving the excellent CRI. At the end of the gradient is an area of constant saturation 641 where the beam color is 7500K with a CRI of 95 shown as 710 in FIG. 7.

Rotating counterclockwise from the open position 605, 650 gradually introduces the temperature lowering amber film 630 which gradually reduces the CCT. As with the blue film, the amber film has an area of constant saturation 631 at the end of the gradient which produces the lowest color temperature of 3000K, for example, with an excellent CRI of 87 shown as point 720 in FIG. 7.

Figure 8:
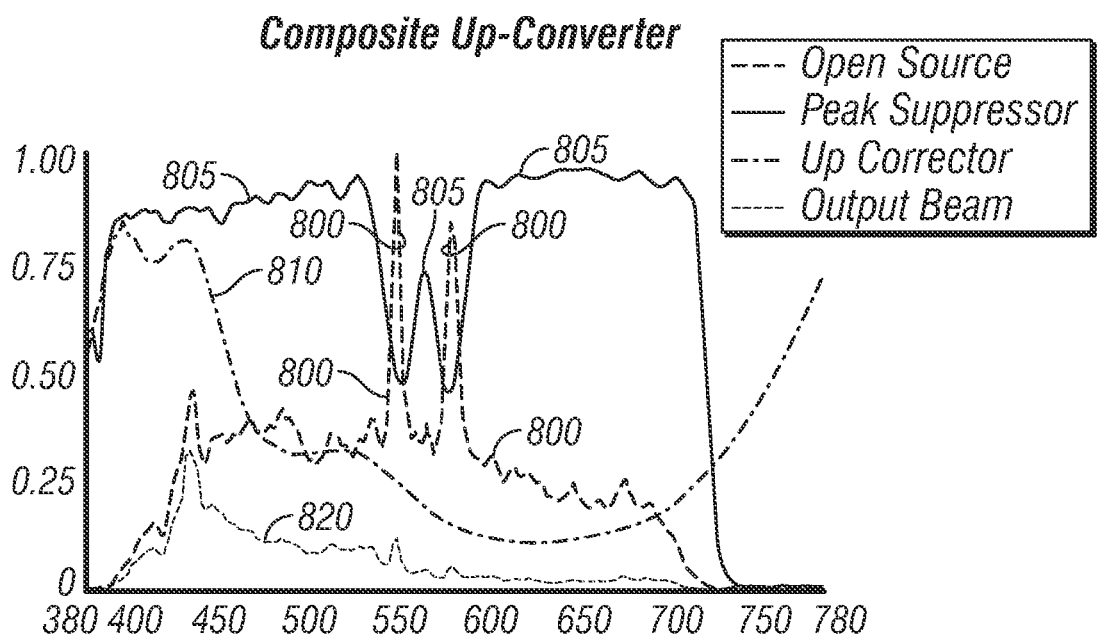
FIGS. 8 and 9 respectively show transfer curves for the composite up converter and down converter of embodiments.
Figure 9:
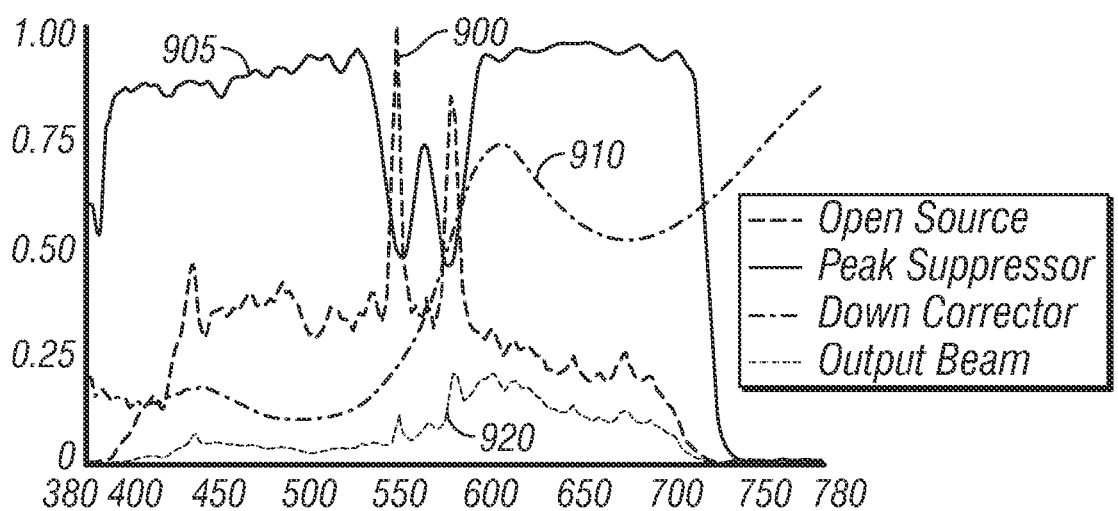

FIGS. 8 and 9 show the spectral effects of the composite filtration in the fully saturated sectors. FIG. 8 shows the arc lamp source's spectrum as curve 800 and, the peak suppression filter's spectral response as curve 805 in green and the spectral response of the up-converting color correction filter as curve 810. The composite output spectrum of the luminaire is shown as curve 820. Likewise, FIG. 9 shows the composite effect of the filtration in the saturated down-correcting sector of the wheel with the light source curve 900, the peak suppression spectral response curve 905, up converting correction filter 910 and overall spectral response 920.

These take into account various features. The mercury spectrum peak suppression filter improves CRI dramatically and raises color temperature somewhat on its own. The color compensating films should thus be designed for taking into account the effect of the peak suppressor.

The embodiment described above is the preferred embodiment but one of many possible implementations of the concepts disclosed. A wheel with more or less color correction films may be constructed allowing correction flexibility to a greater or lesser degree. If more than two color correction films are deposited in multiple sectors, a piece-wise continuous locus of color points may be constructed which encompasses a longer portion of the Planckian Locus and which also tracks the Planckian curve more precisely. Since the loci of color points of varying saturation are straight lines, one tends to deviate away from the black body curve for large excursions of color temperature variation. Building a wheel with several coated sectors reduces the length of each sector's locus in CIE space and thereby its deviation from a good CRI. Successive sectors of different patterned filters can produce a composite locus that stays remarkably close to the black body curve thereby preserving Color Rendering Index.

Other embodiments are possible and the inventor intends these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, while this describes certain kinds of high intensity discharge lamps, the techniques described herein can be used with other kinds of discharge lamps. Also, while this describes wheels, other techniques of filters can be used.

This system can be used in a stage lighting device, of a type which uses a lamp which produces light, this color correction filter as described herein, as well as a color and effect producing parts that are conventionally in these lamps, such as gobos and color filters. This can also be used for example with a zoom lens. The system can be used in a remotely controllable light of a type which is controllable over a line from a control console, for example using DMX or some other light control format. The lamp can be controllable to move to point in different directions, for example can be controllable to point in pan and tilt.

Both the lamp and the console may be controlled by computers, and the computer may control the position to which the filter of the current application is positioned.

The inventor intends that only those claims which use the words "means for" are intended to be interpreted under 35 USC 112, sixth paragraph. Moreover, no limitations from the specification are intended to be read into any claims, unless those limitations are expressly included in the claims. The system described herein can be controlled by any kind of computer, either general purpose, or some specific purpose computer such as a workstation. The computers in the lamp may be x86 or Apple processors. The computer may also be a handheld computer, such as a PDA, cell phone, or laptop. The computer can be a console that controls the processor in the assembly, over a remote control line, e.g. via DMX 512. There may be a user interface that also controls this operation.

The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

What is claimed is:

1. A color correction filter assembly comprising:
   an optical substrate;
   a first coating on a first surface of said optical substrate, said first coating first attenuating by a first amount both first and second spectral peaks in an optical beam passing through said optical substrate, said first amount being greater than a second amount by which areas outside a range including said spectral peaks are attenuated, and where said first attenuating by said first amount is by an amount less than 70% attenuation; and
   a second coating on a second surface of the optical substrate which operates as a color correction filter, wherein said first surface of the optical substrate and said second surface of the optical substrate are opposite surfaces of the optical substrate, wherein said second coating has a first color correction filter property on a first area of the second surface of the substrate, said first color correction filter property which raises a color temperature of the light beam and wherein said second coating has a second color correction filter property on a second area of the second surface of the substrate which lowers the color temperature of the light beam.

2. A filter assembly as in claim 1, wherein said second surface includes an area where there is no second coating, and an edge of said second coating has a density gradient effective to prevent said filter edge from being visible in a beam that passes through the edge.

3. A filter assembly as in claim 1, wherein said first and second peaks comprise areas of two mid-band mercury peaks for spectral emission, where said first and second peaks include a first peak above 520 nm and a second peak below 600 nm.

4. A filter assembly as in claim 3, wherein said filters reduce the energy in the areas of said two mid-band Mercury peaks, without removing all of the energy in said areas.

5. A filter assembly as in claim 4, wherein said first and second peaks include area centered around 546 nm and 578 nm.

6. The filter assembly as in claim 1, wherein said first coating includes a dual peak suppression filter.

7. A filter assembly as in claim 6, wherein said optical substrate is in the shape of a wheel, and where said second coating has filter properties that vary on different areas of said wheel.

8. The filter assembly as in claim 6, wherein said first coating covers only a portion of the substrate, leaving an area of the substrate which does not have the first coating thereon and which does not filter light in said area.

9. The filter assembly as in claim 8, further comprising at least one density gradient adjacent said area which is left open.

10. The filter assembly as in claim 6, wherein said second coating includes a first area that raises a color temperature of light passing there through and a second area that lowers a color temperature of light passing there through.

11. The filter assembly as in claim 1, wherein said second coating includes a density gradient.

12. The filter assembly as in claim 11, wherein said optical substrate is circular, and said density gradient is along a circumferential direction of the substrate.

13. The filter assembly as in claim 12, wherein said second coating includes an area of constant density gradient.

14. The filter assembly as in claim 1, wherein said second coating forms a color correction filter that has a variable color correction filter characteristic, with a first area that has no coating, a second area in a first direction relative to said first area that raises a color temperature of the beam, and a third area in a second direction relative to said first area that lowers a color temperature of the beam.

15. A color correction filter comprising:
an optical substrate,
a first coating on an area of a first surface of said optical substrate, attenuating by a first amount both first and second mid-band mercury-created spectral peaks in an optical beam passing through said optical substrate, where said first and second peaks include a first peak above 520 nm and a second peak below 600 nm, said first amount being greater than a second amount by which areas outside a range including said spectral peaks are attenuated, and where said attenuating by the first amount reduces the energy in areas of said first and second mid-band mercury peaks, without removing all of the energy in said first and second areas, where said first coating has the same filtering characteristic over said area; and
a second coating on a second surface of said optical substrate that has a characteristics that carries out a function of a color correction filter that varies across different areas of said optical substrate,
wherein said first surface of the optical substrate and said second surface of the optical substrate are opposite surfaces of the optical substrate, wherein said second coating has a first color correction filter property on a first area of the second surface of the substrate, said first color correction filter property which raises a color temperature of the light beam and wherein said second coating has a second color correction filter property on a second area of the second surface of the substrate which lowers the color temperature of the light beam.

16. A filter as in claim 15, wherein said optical substrate is in the shape of a wheel having different areas of coating on different areas of said wheel.

17. A filter as in claim 15, wherein said first attenuating of said spectral peaks is by an amount less than 55%, and further operating for second attenuating of areas outside said range surrounding said spectral peaks by said second amount less than 20%.

18. A filter as in claim 15, wherein said first and second peaks include area centered around 546 nm and 578 nm.

19. The filter as in claim 15, wherein said first coating covers only a portion of the substrate as said area, leaving an open area of the substrate which does not have the first coating thereon and which does not filter light in said area.

20. The filter as in claim 19, further comprising at least one density gradient in said first coating adjacent said area of the substrate which does not have the first coating thereon, and an edge of said first coating has the density gradient effective to prevent said filter edge from being visible in a beam that passes through the edge.

21. The filter as in claim 15, wherein said second coating includes a first area on the substrate which raises a color temperature of the light beam and a second area of the substrate which lowers the color temperature of the light beam.

22. The filter as in claim 21, wherein said second coating in said first and second areas each include a density gradient across said color correction filter.

23. The filter as in claim 22, wherein said optical substrate is circular, and said density gradient is along a circumferential direction of the filter wherein said second surface includes an area where there is no second coating, and an edge of said second coating has a density gradient effective to prevent said filter edge from being visible in a beam that passes through the edge.

24. The filter as in claim 23, wherein said second coating forms a color correction filter that has a variable color correction filter characteristic, with a first area that has no coating, a second area in a first direction relative to said first area that raises a color temperature of the beam, and a third area in a second direction relative to said first area that lowers a color temperature of the beam.

25. The filter as in claim 15, wherein said coating includes first and second coatings that are on the same surface of the optical substrate.

26. A color correction filter comprising:
an optical substrate, having first and second coatings coated on said optical substrate, said first coating being on a first surface and attenuating by a first amount both first and second spectral peaks in an optical beam passing through said optical substrate over a first area of said substrate, said first amount being greater than a second amount by which areas outside a range including said spectral peaks are attenuated, and where said attenuating by the first amount reduces the energy of said first and second peaks, without removing all of the energy in said first and second peaks, and said second coating being on a second surface and carries out a first color correction filtering on a first area of the substrate which raises a color temperature of the light beam and a second color correction filtering on a second area of the substrate which lowers the color temperature of the light beam, where both said first and second color correction filtering correct color of an optical beam also passing through said first coating, wherein both said first and second coatings cover only a portion of the substrate, leaving an open area of the substrate which does not have the first coating thereon and which does not filter light in said area, and where edges of both said first coating and said second coating that are adjacent to said open area, have a density gradient effective to prevent said filter edge from being visible in a beam that passes through the edges, wherein said first surface of the optical substrate and said second surface of the optical substrate are opposite surfaces of the optical substrate, wherein said second coating has a first color correction filter property on a first area of the second surface of the substrate, said first color correction filter property which raises a color temperature of the light beam and wherein said second coating has a second color correction filter property on a second area of the second surface of the substrate which lowers the color temperature of the light beam.

27. A filter as in claim 26, wherein said first and second peaks are first and second mid band mercury peaks where said first and second peaks include a first peek above 520 nm and a second peak below 600 nm.

28. A filter as in claim 26, wherein said optical substrate is in the shape of a wheel having different areas of coating on different areas of said wheel.

29. A filter as in claim 26, wherein said first attenuating of said spectral peaks is by an amount less than 55%, further operating for second attenuating of areas outside said range surrounding said spectral peaks by said second amount less than 20%.

30. A filter as in claim 26, wherein said first and second peaks include areas centered around 546 nm and 578 nm.

31. The filter as in claim 30, wherein said first coating has an optical characteristic that is constant across an area of said substrate, and said second coating has an optical characteristic that varies across said substrate.

32. The filter as in claim 31, wherein said second coating has a second area in a first direction relative to said open area that raises a color temperature of the beam, and a third area in a second direction relative to said open area that lowers a color temperature of the beam further comprising at least one density gradient adjacent said area which is left open.

33. The filter as in claim 26, wherein said second coating includes a density gradient across areas of said first and second color correction filtering.

34. The filter as in claim 33, wherein said optical substrate is circular, and said density gradient is along a circumferential direction of the filter.

35. The filter as in claim 33, wherein said second coating includes an area of constant density gradient of said first and second color correction filtering.

36. A method of color correction, comprising:

on a first surface of an optical filter has a first coating, attenuating a light beam by a first amount both first and second mid-band mercury-based spectral peaks in an optical beam passing through said optical filter, where said first and second peaks include a first peak above 520 nm and a second peak below 600 nm said first amount being greater than a second amount by which areas outside a range including said spectral peaks are attenuated, and where said attenuating by the first amount reduces the energy in the areas of said first and second mid-band mercury peaks, without removing all of the energy in said first and second areas; and on a second surface of said optical filter has a second coating, also variably correcting a color of the light beam that has had its first and second spectral peaks corrected by moving the optical filter in a first direction relative to a reference to increase a color temperature of the light, and moving the optical filter in a second direction relative to the reference to decrease the color temperature of the light, wherein said first surface of the optical filter and said second surface of the optical filter are opposite surfaces of an optical substrate forming the optical filter, wherein said second coating has a first color correction filter property on a first area of the second surface of the substrate, said first color correction filter property which raises a color temperature of the light beam and wherein said second coating has a second color correction filter property on a second area of the second surface of the substrate which lowers the color temperature of the light beam.

37. The method as in claim 36, wherein said first attenuating of said spectral peaks is by an amount less than 55%, and said second attenuating of areas outside said range surrounding said spectral peaks is by an amount less than 20%.

38. The method as in claim 36, wherein said first and second peaks include areas centered around 546 nm and 578 nm.

39. The method as in claim 36, further comprising filtering using an area in said first coating which is left open and does not carry out said attenuating said peaks.

* * * * *